(12) United States Patent
Miller et al.

(10) Patent No.: US 9,008,168 B2
(45) Date of Patent: Apr. 14, 2015

(54) SIGNAL EQUALIZER FOR BALANCED TRANSFER LINE-BASED VIDEO SWITCHING

(71) Applicant: Magenta Research Limited, New Milford, CT (US)

(72) Inventors: Chris Miller, Kent, CT (US); Keith Mortensen, New Milford, CT (US)

(73) Assignee: Magenta Research Limited, New Milford, CT (US)

(*) Notice: Subject to any disclaimer, the term of this patent is extended or adjusted under 35 U.S.C. 154(b) by 0 days.

(21) Appl. No.: 14/086,212

(22) Filed: Nov. 21, 2013

(65) Prior Publication Data
US 2014/0152897 A1    Jun. 5, 2014

Related U.S. Application Data

(63) Continuation of application No. 11/948,826, filed on Nov. 30, 2007, now abandoned.

(60) Provisional application No. 60/887,766, filed on Feb. 1, 2007.

(51) Int. Cl.
| | |
|---|---|
| *H03H 7/30* | (2006.01) |
| *H03H 7/40* | (2006.01) |
| *H03K 5/159* | (2006.01) |
| *H04N 5/44* | (2011.01) |
| *H04N 5/268* | (2006.01) |
| *H04N 9/68* | (2006.01) |

(52) U.S. Cl.
CPC ............... *H04N 5/44* (2013.01); *H04N 5/268* (2013.01); *H04N 9/68* (2013.01)

(58) Field of Classification Search
CPC ............ H04B 3/32; H04B 3/23; H04L 25/14; H04L 12/10; H04L 25/0276
USPC ............... 375/229–236, 257, 259–260, 285, 375/316–319, 322, 324, 328, 340, 345–346, 375/349–351, 354, 356
See application file for complete search history.

(56) References Cited

U.S. PATENT DOCUMENTS

| | | | | |
|---|---|---|---|---|
| 3,578,914 | A | * | 5/1971 | Simonelli ..................... 370/284 |
| 5,901,340 | A | * | 5/1999 | Flickinger et al. ............ 725/149 |
| 2003/0025514 | A1 | | 2/2003 | Benes |

(Continued)

OTHER PUBLICATIONS

Mohawk/CDT "5e LAN Power Sum" 25 Piar #24 AWG UTP CAT 5e Cable. Dated Jun. 2003.

(Continued)

*Primary Examiner* — Sam K Ahn
*Assistant Examiner* — James M Perez
(74) *Attorney, Agent, or Firm* — Schwegman Lundberg & Woessner, P.A.

(57) ABSTRACT

A method of equalizing signals from a plurality of balanced transmission line cables having different lengths includes providing a first cable having a first length and a second cable having a second length, the first cable coupled to a variable resistor. A first signal is transmitted along the first cable to the variable resistor such that the first signal is attenuated to assume a first frequency domain characteristic. A second signal is transmitted along the second cable such that the second signal is attenuated to assume a second frequency domain characteristic. A voltage of the first signal is divided in the variable resistor such that the first signal assumes substantially the second frequency domain characteristic. The first signal having the second frequency domain characteristic is outputted.

17 Claims, 6 Drawing Sheets

(56) References Cited

U.S. PATENT DOCUMENTS

2003/0169374 A1    9/2003    Coles et al.
2005/0198687 A1    9/2005    Miller
2008/0186407 A1    8/2008    Miller et al.

OTHER PUBLICATIONS

"5e LAN Power Sum", 25 Pair #24 AWG UTP CAT 5e Cable, Mohawk/CDT, (Jun. 2003).

"U.S. Appl. No. 11/948,826, Non Final Office Action mailed May 23, 2013", 17 pgs.

"U.S. Appl. No. 11/948,826, Response filed Jun. 13, 2012 to Restriction Requirement mailed Nov. 10, 2011", 1 pg.

"U.S. Appl. No. 11/948,826, Restriction Requirement mailed Nov. 10, 2011", 7 pgs.

* cited by examiner

SIGNAL EQUALIZER FOR BALANCED TRANSFER LINE-BASED VIDEO SWITCHING

BACKGROUND OF THE INVENTION

1. Field of the Invention

The present invention relates to video switching equipment, and in particular, to a signal equalizer device, system, and method for shielded and unshielded twisted pair-based video switching.

2. Description of Related Art

A video switch allows a user to route a plurality of video source inputs to a single or plurality of video displays. Video switching is typically performed by centralized equipment having input and output ports through which video signals interface. However, there are a number of obstacles in displaying video with high quality. Video switching devices are subject to signal arrival skew, which occurs when multiple channels of video are propagated through physically separate transmission lines. Also, when a video source and display are connected through transmission lines, video signal quality suffers as the length of the transmission line increases. In a video switching environment, input signals from multiple sources that are otherwise identical will appear inconsistent if transported over cables of varying length. Furthermore, undesirable variations in video quality will appear as the video switch selects different inputs to be displayed. When the input signals are of varying quality, video switching performance is further degraded.

Transmission lines, such as coaxial cables, fiber optic cables, and unshielded twisted pair cables, impose losses that are manifested as attenuation and high frequency roll off, which are the combined result of ohmic, skin effect, dielectric and radiation losses. High-resolution analog signals that contain a very broad spectrum of energy, often occupying 20 octaves or more per channel, are especially susceptible to attenuation and roll off even in moderately long cables. Visually, cable losses are manifested as horizontal aperture distortion (smearing) and a loss of fine detail resolution.

Conventionally, the transportation of high-resolution video over long distances has required the use of fiber optic transmission or multiple coaxial cables. However, these cables are both costly and cumbersome, often requiring the installation of as many as five individual fibers or coaxial cables. Termination of coaxial cables is difficult and expensive in comparison to other cable types such as shielded and unshielded twisted pair (STP, UTP) cables.

Recently, UTP cable lines, such as category cables, have been employed in the transportation of high bandwidth applications, such as video. Category cables, such as CAT-5, CAT-5e and CAT-6, are cables that combine four separate, unshielded, twisted pair transmission lines into a single sheath. Category cables are typically used in telephony and local area network applications and are commonly referred to as Ethernet cables. UTP cables provide both the low cost and the convenience of a single, easily terminated cable.

However, video transmission using UTP cables presents problems that prevent widespread adoption over the more commonly used coaxial cables. Many UTP cables employ varying twist rates for each pair of conductors to improve crosstalk characteristics. Improved crosstalk comes at the expense of varying propagation speeds between individual pairs within a given cable sheath. If not corrected, video signals will display artifacts as horizontally displaced, colored fringing on vertical image elements that are visible in both graphics and text. UTP cables are also susceptible to signal arrival skew. While UTP cables are inexpensive and easier to install and maintain than coaxial cables, current solutions have not provided comparable performance to coaxial cables for high-resolution video over moderate to long distances.

In order to solve the problems present in video switching applications, "peaking" adjustments have been incorporated into video switches and video distribution amplifiers. These simplistic adjustments, typically accomplished using elementary single pole, shelved high pass networks, increase high frequency gain near the top of the expected signal bandwidth. In this manner, signals are equalized such that video signals transported over long cable runs are made to behave like video signals transported over short cable runs. Such compensation for cable length is referred to as positive equalization (positive EQ). However, the conventional solutions are effective only for low bandwidth, low-resolution, NTSC type video sources and switches. Only perfunctory compensation for moderately long source to input port cables are provided. Utilizing only a single time constant, the resulting transfer functions obtained conventionally do not provide the accuracy and frequency response necessary for high resolution analog video signals. The current solutions for providing positive EQ are inadequate for equalizing high-resolution video signals and video signals transported over long distances.

SUMMARY OF THE INVENTION

In one embodiment of the invention, a method of equalizing signals from a plurality of balanced transmission line cables having different lengths includes providing a first cable having a first length and a second cable having a second length, the first cable coupled to a variable resistor. In the context of this description, the "first" or "second" cable can be a single cable or a series of cables coupling electrical elements. A first signal is transmitted along the first cable to the variable resistor such that the first signal is attenuated to assume a first frequency domain characteristic. A second signal is transmitted along the second cable such that the second signal is attenuated to assume a second frequency domain characteristic. A voltage of the first signal is divided in the variable resistor and a reciprocal transfer function is applied through a cable filter such that the first signal assumes substantially the second frequency domain characteristic. The first signal having the second frequency domain characteristic is outputted. The dividing includes comparing the first length and second length, and if the first length is greater than the second length, dividing the voltage to increase attenuation of the first signal. If the second length is greater than the first length, dividing the voltage to decrease attenuation of the first signal. The balanced transmission line cable is an unshielded twisted pair cable. The balanced transmission line cable is a shielded twisted pair cable.

In another embodiment, a signal equalizer for equalizing a signal transmitted along a balanced transmission line cable comprises a first variable resistor for receiving the signal and dividing a voltage of the signal. A cable filter is provided for receiving the signal from the variable resistor and applies a reciprocal transfer function. An amplifier has an inverted input for receiving the inverted signal from the cable filter and a non-inverted input for receiving a signal ground. The amplifier has a shunt between the inverted input and the non-inverted input. A dynamic stabilizer coupled to the amplifier is provided, the dynamic stabilizer controlled by a second variable resistor. The balanced transmission line cable is an unshielded or shielded twisted pair cable.

In another embodiment, a balanced transmission line based signal switching system comprises a signal switch coupled to at least one balanced transmission line video receiver. A plurality of first signal transmitters each coupled to the signal switch by a respective first cable with a first length is provided. At least one second signal transmitter coupled to the signal switch by a second cable with a second length different from the first length is provided. At least one cable equalizer coupled between a respective one of the at least one second signal transmitter and the signal switch, and having a variable resistor for dividing a voltage of a signal received from a respective one of the at least one second signal transmitter, and a cable filter for applying a reciprocal transfer function to the signal received from the respective one of the at least one second signal transmitter, the variable resistor and cable filter capable of providing negative equalization to the signal. A video receiver coupled to the video switch and a display coupled to the video receiver is provided. The number of the plurality of first signal transmitters is greater than a number of the at least one second signal transmitter. The variable resistor is capable of providing positive equalization to the signal. The variable resistor is adjustable to provide positive equalization, negative equalization, or no equalization to the signal. The balanced transmission line cable is an unshielded or shielded twisted pair cable.

DETAILED DESCRIPTION OF THE INVENTION

Figure 1:
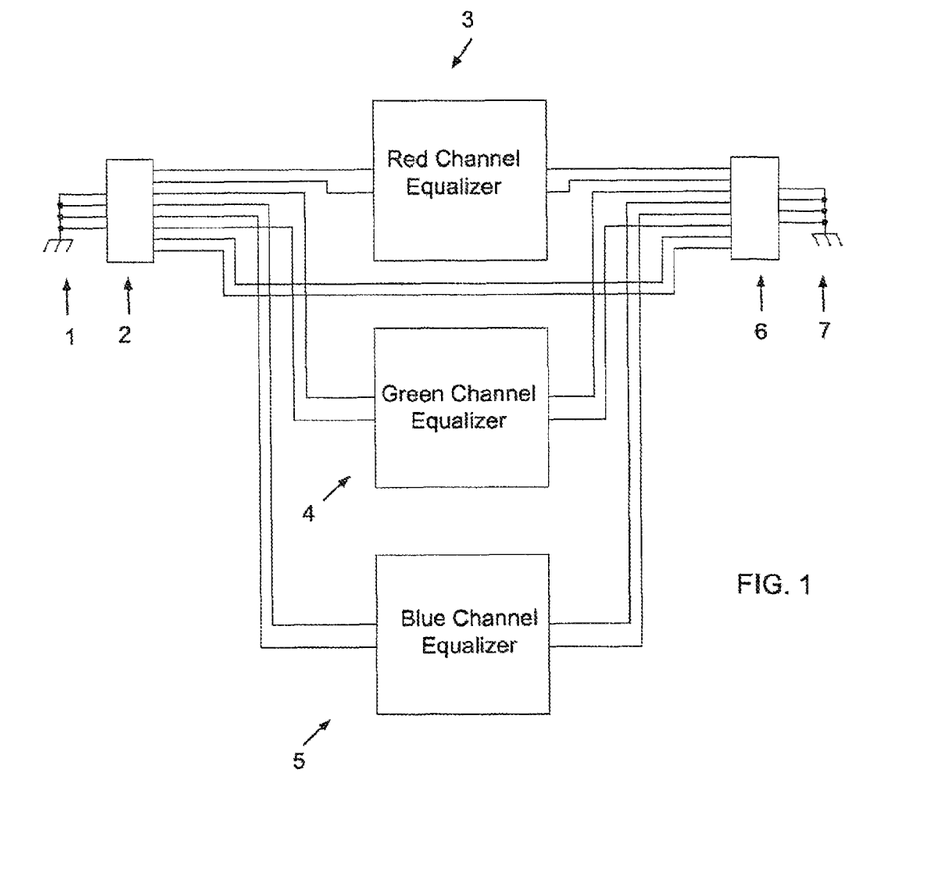
FIG. 1 is a block diagram of a cable equalizer module according to one aspect of the present invention.

FIG. 1 is a block diagram of one embodiment of a signal equalizer. An input signal is received from UTP cable 1 into RJ-45 input jack 2. The UTP cable 1 contains the high resolution analog video signal. Each of the red, green and blue color signals is transmitted along one of the four twisted pair lines. The fourth twisted pair in the UTP cable is used for auxiliary signals and does not undergo signal processing and is simply passed through the equalizer. The red, green and blue channel signals are ported to their respective color channel equalizers 3-5, where they are equalized as described below. After equalization, the signals are outputted at RJ-45 output jack 6 to UTP cable 7. The structure of the red, green and blue channel equalizers 3-5 are identical. For the sake of clarity, only the operation of the red channel equalizer 3 will be discussed in detail, since the green and blue channel equalizers operate in the same manner.

Figure 2:
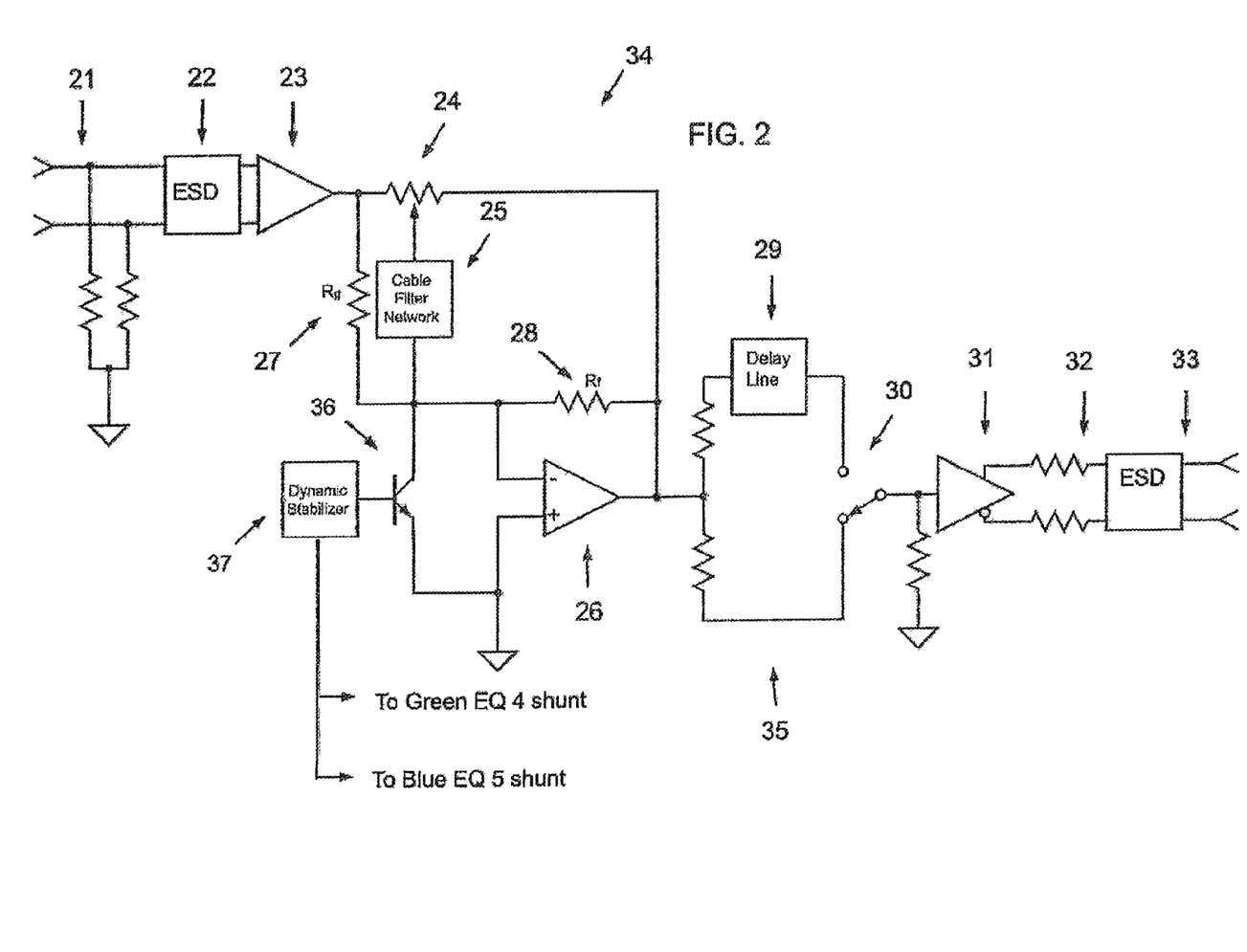
FIG. 2 is a block diagram of a single color channel equalizer according to another aspect of the present invention.

As shown in FIG. 2, when the signal is received at the red channel equalizer 3, the transmission line cable is forward terminated at signal input 21. The signals are then presented to the electrostatic discharge (ESD) protection network 22. A differential line receiver 23 follows the ESD protection network 22 and buffers the incoming differential mode signals and rejects the common mode signals. The ESD protection network 22 prevents destructive electrical impulses from reaching differential line driver 23. The desired differential signals are recovered and then input into the equalization stage 34. The equalization stage 34 includes a potentiometer 24, cable equalization filter 25, high gain bandwidth amplifier 26, gain setting resistor 27 and feedback resistor 28.

The cable equalization filter 25 is a two-port filter network that provides a reciprocal transfer function which nearly matches that of the input cable according to the following equation where f is frequency in MHz:

$$\text{Attenuation in dB/ft} \approx 0.003012(1.97\sqrt{f}) + (0.023f) + 0.05\sqrt{f}$$

The equalization stage 34 follows a boost-cut topology typically used in audio applications, such as graphic equalizers. The potentiometer 24 forms a two element resistive divider with a wiper therebetween. The portion of the circuit between the input side of the circuit and the wiper contains a gain setting resistor 27. The portion of the circuit between the output of high gain bandwidth amplifier 26 and the wiper contains a feedback resistor 28. Adjusting the ratio of the gain setting resistor 27 and feedback resistor 28 by adjusting the potentiometer 24 changes the gain of equalization stage 34 to produce either positive, negative or zero equalization, as is discussed below.

In one embodiment, the equalization stage 34 supports a maximum expected bandwidth of between 40-100 MHZ to compensate for cable losses in high-resolution video signals. 500 feet of UTP cable imposes a loss of 22 dB at 50 MHz. This loss is compensated for by equalization stage 34, which relies on a high gain bandwidth. High gain bandwidth amplifier 26 is a decompensated op-amp. However, decompensated op-amps are unstable below a certain threshold of gain and cannot typically provide stable operation at unity gain.

Figure 3:
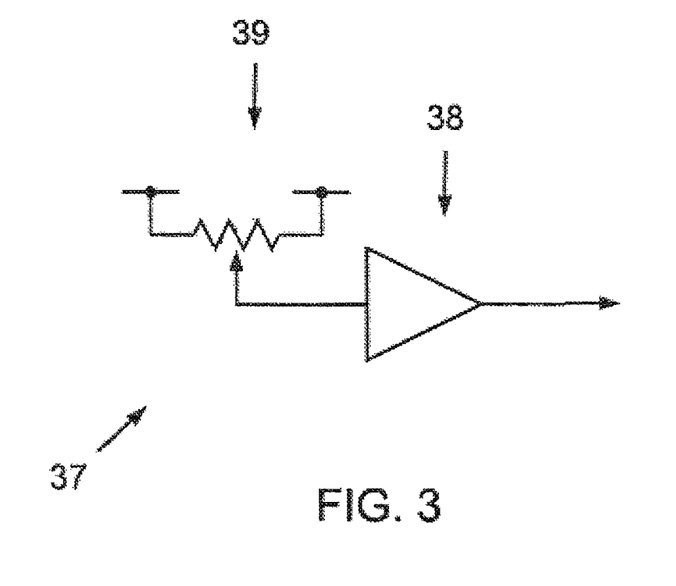
FIG. 3 is a block diagram of a dynamic stabilizer module according to another aspect of the present invention.

In order to dynamically stabilize the high gain bandwidth amplifier 26, the inverting and non-inverting inputs of amplifier 26 are shunted together, thereby reducing the noise gain. Shunting the inputs with a transistor 36 provides external re-compensation to amplifier 26. A signal equalizer consists of four potentiometers that are connected to and controlled by a common shaft. The common shaft is connected to an adjustment control that is operated by the user. Three of the potentiometer elements are used in the red, green and blue channel equalizers 3-5 and the fourth potentiometer 38 is used to control the dynamic stabilizer 37. Therefore, adjustments made by the user are applied equally to each of the color channel equalizers 3-5 and dynamic stabilizer 37. While a color channel equalizer 3-5 is provided for each color, only a single dynamic stabilizer 37 is provided in the signal equalizer.

The dynamic stabilizer 37, or throttle circuit, of FIG. 3 is connected to a control signal amplifier 38 and outputs a buffered voltage to amplifier 26 to ensure operation in the required bandwidth. The output voltage is proportional to the wiper position of potentiometer 39. Without the dynamic stabilizer 37, the amplifier would become unstable and unusable at low gain.

Referring to FIGS. 2 and 3, the equalization stage 34 of this embodiment of the present invention is not limited to the use of a externally re-compensated op-amp and dynamic stabilizer. Any amplifier meeting desired characteristics may be used. Furthermore, any variable resistor may be used in place of potentiometer 24.

An example of the operation of the equalization stage 34 is provided below. When the wiper of a potentiometer 24 is set by a user in the center or neutral position, the equalization stage 34 provides a flat unity gain passband. The electrical loss of the UTP cable is the same at the output of the equalizer as at the input of the equalizer. The neutral position provides zero equalization.

When the adjustment control of potentiometer 24 is set to a maximum positive equalization position, a signal that has traveled 500 feet over UTP cable assumes the frequency domain characteristics of a signal that has traveled 0 feet. Positive equalization compensates for electrical cable losses by virtually shortening the cable length from 500 feet to 0 feet. The signal equalizer in this embodiment of the present invention can provide a desired positive equalization for cables of length anywhere from 0 to 500 feet.

At maximum positive equalization, the cable equalization filter 25 becomes in parallel with gain setting resistor 27. The gain of amplifier 26 becomes the frequency dependent ratio represented by the following equation, where Zn is the impedance of cable equalization filter 25, $R_f$ is the resistance of feedback resistor 28 and $R_g$ is the resistance of gain setting resistor 27:

$$Gain = |R_f| + |Zn|/|R_g|$$

When the adjustment control of potentiometer 24 is set to a maximum negative equalization position, a signal that has traveled 0 feet assumes frequency domain characteristics of a signal that has traveled 500 feet. Negative equalization allows a UTP cable to behave as if the cable is longer and more lossy. The signal equalizer of this embodiment of the present invention can synthesize cable length from 0 to 500 feet to provide a desired negative equalization.

At maximum negative equalization, the cable equalization filter 25 becomes connected in parallel with feedback resistor 28 and appears exclusively as part of the feedback path of high gain bandwidth amplifier 26. The gain of amplifier 26 becomes the frequency dependent ratio represented by the following equation, where Zn is the impedance of cable equalization filter 25, $R_f$ is the resistance of feedback resistor 28 and $R_g$ is the resistance of gain setting resistor 27:

$$Gain = R_g/(1/R_f + 1/Zn)$$

The potentiometer of this embodiment can be infinitely varied between the aforementioned extremes, allowing the equalizer to neutralize or synthesize any desired cable length within the range of −500 to 500 feet. In this manner, a cable signal can move from positive equalization down to zero equalization and then onto negative equalization.

At the output of equalization stage 34, skew compensation 35 is applied to the signal using a 10 ns delay line 29 and a selectable delay switch 30. Skew compensation prevents artifacts from appearing due to variations in propagation speeds of different color channels. For example, if the red channel signal arrives before the blue signal, the switch 30 can be selected to compensate. Following skew compensation stage 35 is a differential line driver 31 to drive the individual transmission line pairs through reverse termination and ESD protection network 32 and to be output at UTP output 33.

Figure 4:
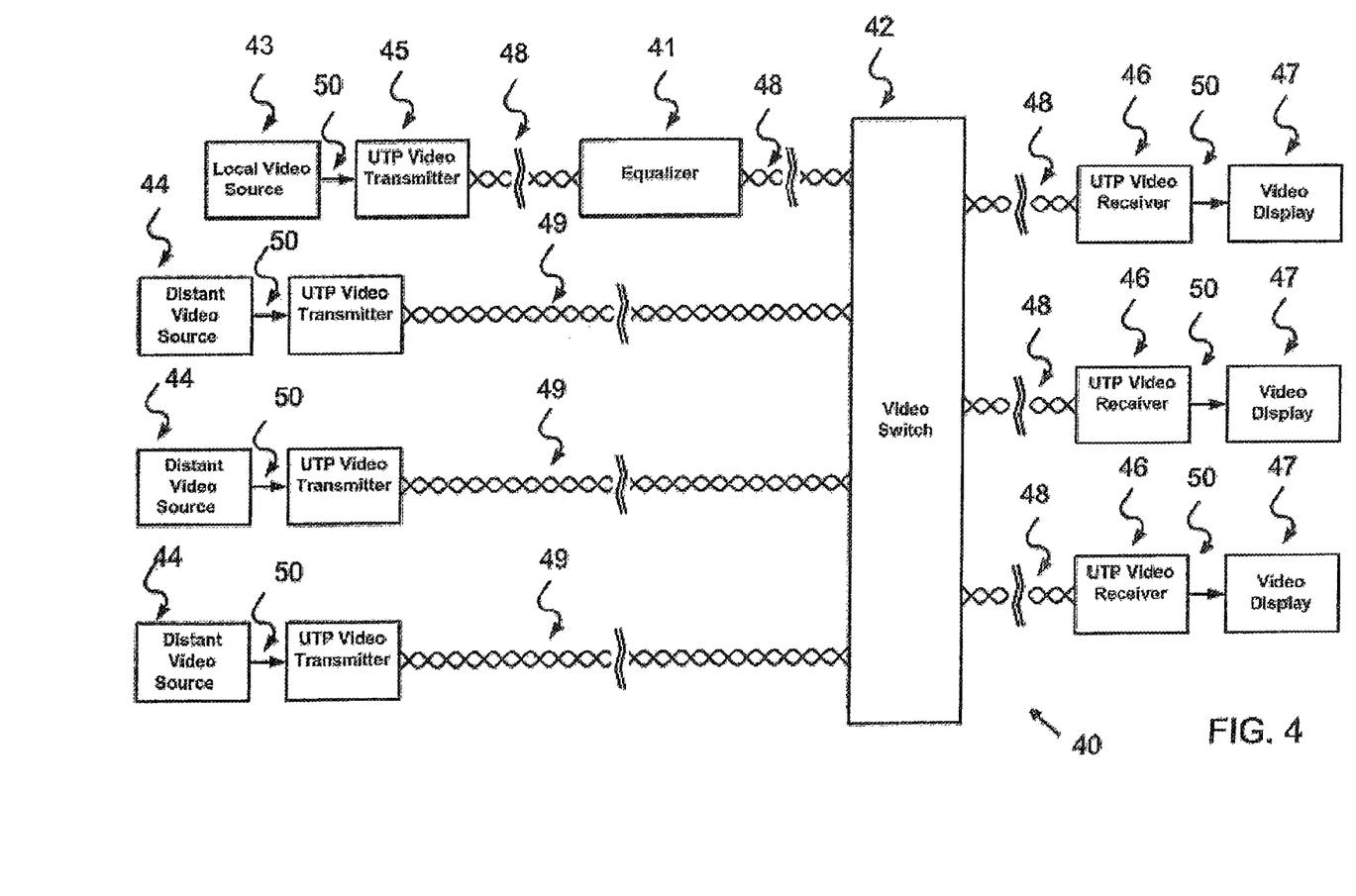
FIG. 4 is a diagram of a video switching system according to another aspect of the present invention.

One embodiment of a video switching system using negative equalization according to the present invention is illustrated in FIG. 4. A video switching system 40 is provided with a video switch 42 having a plurality of inputs. Video switch 42 can output a plurality of video signals to be displayed. Each video source 43 and 44 is connected to a UTP video transmitter 45 that converts multi-component video signals into differential signals that are propagated through UTP cables 48 and 49, respectively. A video interconnect cable connects video sources 43 and 44 to the UTP video transmitter 50. On the output side of video switch 42, UTP video receiver 46 converts received differential signals transported over UTP cable 48 into video signals capable of being displayed on a video display 47. A video interconnect cable 50 connects video receiver 46 to video display 47.

In FIG. 4, most of the video sources are located far from the switch, such that the length of UTP cable 49 required from UTP video transmitter 45 to video switch 42 is long. The distant video sources 44 are all roughly the same length away from the switch 42. However, a single local video source 43 is located close such that only a short UTP cable 48 is required to connect to switch 2. For example, the distant video sources 44 connect to the switch 42 using long UTP cable 49 of 500 feet.

In this embodiment, one local video source 43 connected to an equalizer 41 is provided, but more than one local video source 43 may also be provided. At video switch 42, the plurality of video signals are received and the desired signals are output for display.

Assuming the length of UTP cables 48 are negligible, then equalizer 41 can be set to provide −500 feet of equalization. In other words, the signal from local video source 43 can be made to have identical frequency characteristics as a signal from distant video source 44. Therefore, equalizer 41 creates additional virtual cable length. The signals received at UTP video receiver 46, in this embodiment, possess frequency domain characteristics of propagation along nearly identical cable lengths, due to the negative equalization provided at equalizer 41.

Each UTP video receiver 46 provides compensation for signal loss separate from that of equalizer 41. At UTP video receiver 46, a positive equalization of 500 feet plus the length of UTP cable 48 is provided to compensate for cable loss. The consistency of cable length provided by equalizer 41 allows compensation at UTP video receiver 46 to be set at a single cable distance. Therefore, variations in video quality when video signals are switched are prevented. Without equalizer 41, when a local video is displayed, unnecessary compensation would be applied, resulting in an undesirable video display.

The embodiment of FIG. 1 is cost effective in that only a single or a few sources require equalization. The present embodiment prevents perceptible differences in video quality when switching sources.

In one embodiment, the equalizer 41 is controlled using a single potentiometric adjustment control that allows a user to easily and quickly make a visual calibration with a reference video pattern. For example, the adjustment control can be a knob or a dip switch.

The user selects a pre-determined distant source 44 to display on video display 47. The video receiver 46 coupled to display 47 includes positive equalization functionality. The user equalizes the displayed distant video source 44 at the video receiver 46. Then, a local video source 43 is selected by the switch 42 and output on the same video display 47 where distant source 44 was previously displayed. The user then operates the adjustment control of equalizer 41 to add negative equalization as needed until the quality of video displayed by local source 43 matches that of distant source 44. Without changing the positive equalization set at video receiver 56, the process is repeated for each local video source 43.

By adjusting the control towards negative equalization, a user can visually increase the loss displayed in the local source signal until the visual quality between the sources match. In this embodiment, therefore, special test equipment is not required, which further reduces both the costs and difficulty in equalizing signals. Equalizer 41 may also provide skew compensation in combination with the cable length equalization function.

Figure 5:
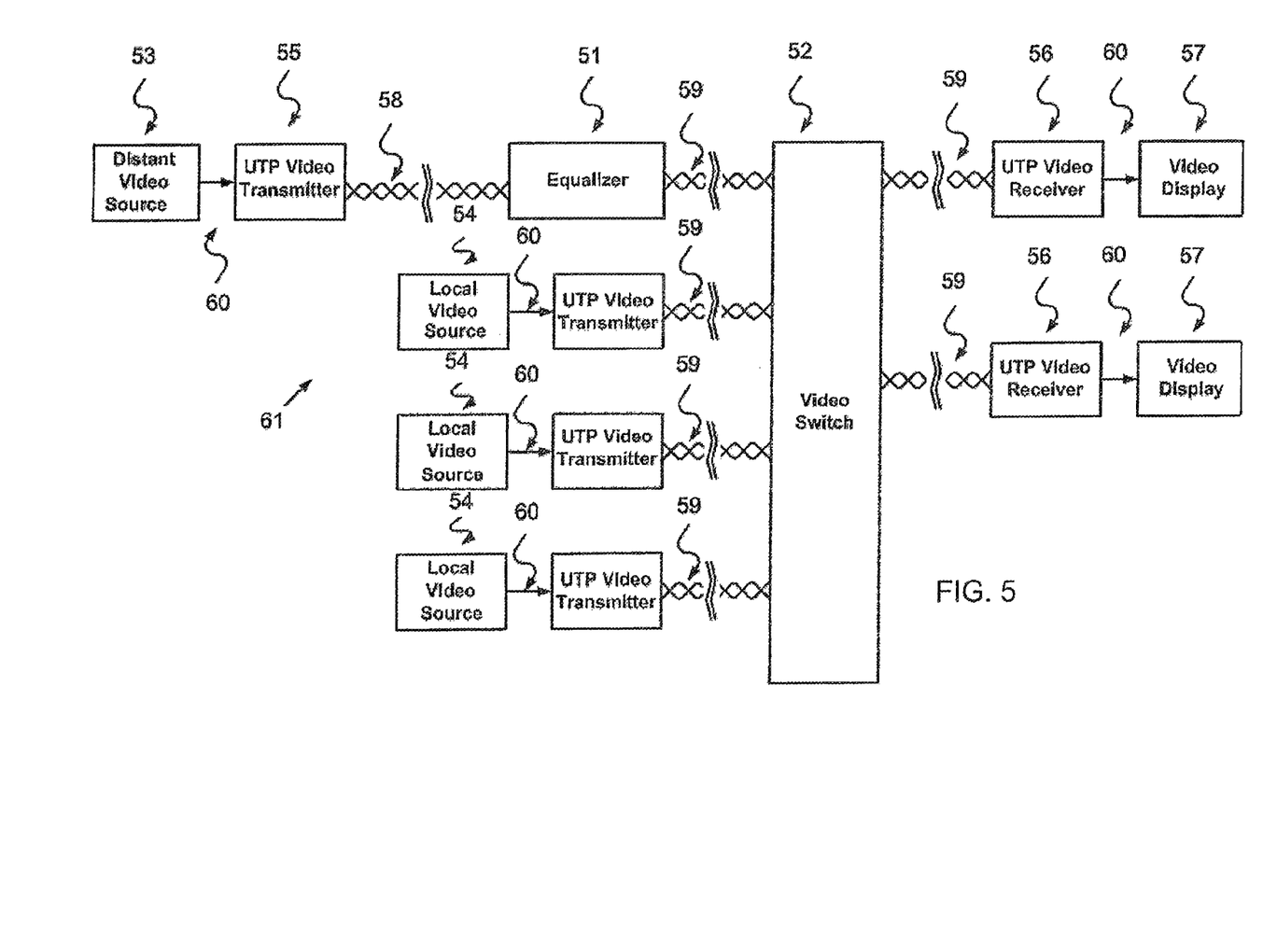
FIG. 5 is a diagram of a video switching system according to another aspect of the present invention.

In FIG. 5, most of the video sources are located close to the switch, such that the length of UTP cable required from UTP video transmitter 55 to video switch 52 is short. The local video sources 54 are all roughly the same length away from the switch 52. However, a single distant video source 53 is located such that a long UTP cable 58 of 500 feet is required to connect to switch 52.

In this embodiment, only one distant video source 53 connected to an equalizer 51 is provided, but more than one distant video source 53 may also be provided. At video switch 52, the plurality of video signals are received and desired signals are output for display. Each UTP video receiver 66 provides compensation for signal loss separate from that of equalizer 51.

In order to compensate for the length of long UTP cable 58, equalizer 58 can be set to provide 500 feet of positive equalization. In other words, the signal from distant video source 53 can be made to have identical frequency characteristics as a signal from local video source 54. Equalizer 51 neutralizes the additional cable length of UTP cable 58. In this embodiment, the signals received at UTP video receiver 66 possess frequency domain characteristics of propagation along nearly identical cable lengths, due to the positive equalization provided at equalizer 51.

The consistency of cable length provided by equalizer 51 allows compensation at UTP video receiver 56 to be set at a single cable distance. Therefore, variations in video quality when video signals are switched are prevented. Additional equalization is provided at UTP video receiver 56 to compensate for UTP cable 59 before and after switch 52.

The embodiment of FIG. 5 is cost effective in that only a single or a few sources require equalization. The present embodiment prevents perceptible differences in video quality when switching sources. Without equalizer 51, when a distant video source is displayed, inadequate compensation would be applied, resulting in an undesirable video display.

In one embodiment, the equalizer 51 is controlled using a single potentiometric adjustment control that allows a user to easily and quickly make a visual calibration with a reference video pattern. For example, the adjustment control can be a knob or a dip switch.

The user selects a pre-determined local source 54 to display on video display 57. The video receiver 56 coupled to display 57 includes positive equalization functionality. The user equalizes the displayed local video source 54 at the video receiver 56. Then, a distant video source 53 is selected by the switch 52 and output on the same video display 57 where local source 54 was previously displayed. The user then operates the adjustment control of equalizer 51 to add positive equalization as needed until the quality of video displayed by local source 54 matches that of distant source 53. Without changing the positive equalization set at video receiver 56, the process is repeated for each distant video source 53.

By adjusting the control towards positive equalization, a user can visually decrease the loss displayed in the distant source signal until the visual quality between the sources match. In this embodiment, therefore, special test equipment is not required, which further reduces both the costs and difficulty in equalizing signals. Equalizer 51 may also provide skew compensation in combination with the cable length equalization function.

In stringent circumstances where cable length must be closely matched for every source, an equalizer can be provided to each source to equalize every signal to a desired virtual cable length. The equalizer is capable of providing positive and negative equalization, depending on the requirements of the system. For example, when a majority of the video sources are local, the positive equalization system of FIG. 5 may be used. Likewise, when a majority of the video sources are distant, the negative equalization system of FIG. 4 may be used.

The embodiments described in FIGS. 4 and 5 provide consistent, high quality video for each input signal regardless of the switch's distance from the source. Because an equalizer need only be provided at a single source or a few sources, installation and maintenance costs can be reduced in providing the performance necessary to display high resolution analog video signals.

Figure 6:
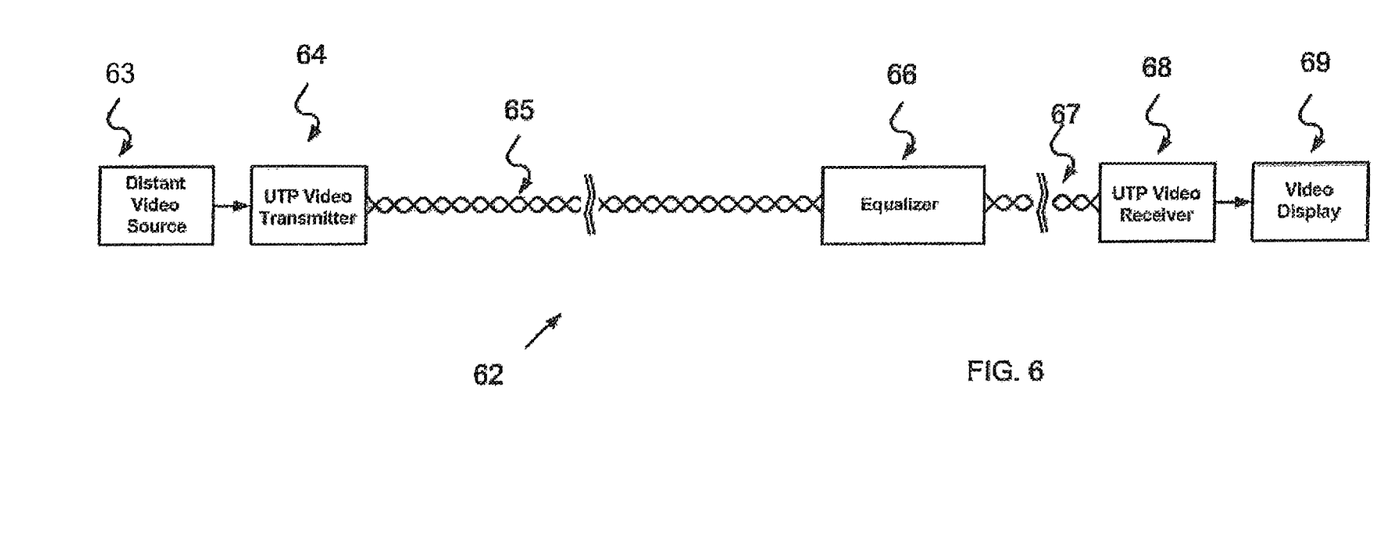
FIG. 6 is a diagram of a UTP cable extender according to another aspect of the present invention.

FIG. 6 describes another embodiment of the present invention. A cable extender system 62 is provided with a distant video source 63, UTP video transmitter 64, long UTP cable 65, equalizer 66, short UTP cable 67, UTP video receiver 68 and video display 69. UTP video receiver 68 can provide positive equalization, but not enough to overcome the length of long UTP cable 65. In this embodiment, an equalizer 66 is placed between the video transmitter 64 and receiver 68 in order to provide additional positive equalization to further extend the operating range an additional 500 feet over the compensation provided at UTP video receiver 68. Thus, high resolution analog video signals can be transported over vast distances without loss of quality.

By utilizing this equalization technique, variations in signal quality when switching between sources can be prevented. The equalizer described above may be built onto a printed circuit board and fitted into a rack-mount equipment frame.

The embodiments of the present invention are not limited to UTP cables and can be used with any balanced transmission line. Shielded twisted pair (STP) cables may be used with any of the embodiments discussed above. Furthermore, the invention is useful for, but is not limited to video switching applications.

Modification to the particular embodiments of the invention described herein may be made without departing from the spirit and scope of the invention. The described embodiments are illustrative and not restrictive, and the scope of the invention is indicated by the appended claims, rather than the foregoing description. All modifications which come within the meaning and range of equivalency of the claims are therefore intended to be embraced therein.

The invention claimed is:

1. A balanced transmission line based video signal switching system comprising:
   a video signal switch coupled to at least one balanced transmission line video receiver;
   a first signal transmitter coupled to the signal switch by a first balanced transmission line cable with a first length;
   at least one second signal transmitter coupled to the signal switch by a second balanced transmission line cable with a second length different from the first length; and
   at least one equalizer coupled between the at least one second signal transmitter and the signal switch, the at least one equalizer comprising:
      an equalization stage including an output amplifier circuit and a first variable resistor configured to select a gain of the equalization stage to selectively provide (1) positive equalization and (2) negative equalization;
      a stabilizer stage including a second variable resistor and a control signal amplifier, the control signal amplifier configured to provide a buffered voltage to the output amplifier circuit based on a selected resistance of the second variable resistor;

wherein the equalization stage further includes a cable equalization filter configured to shunt a portion of the input signal, received from the first variable resistor, to an input terminal of the output amplifier, and wherein the first variable resistor is a three-terminal potentiometer; and wherein the equalization stage further includes a gain setting resistor arranged in parallel with a series combination of the first variable resistor and a feedback resistor, wherein the feedback resistor is arranged in a feedback path of the output amplifier circuit, and wherein the gain of the equalization stage is based on a ratio of the gain setting resistor and the feedback resistor.

2. The system of claim 1, wherein the second balanced transmission line cable is a shielded twisted pair cable.

3. The system of claim 1, wherein the second balanced transmission line cable is a unshielded twisted pair cable.

4. The system of claim 1, wherein the cable equalization filter is further configured to apply a reciprocal transfer function to the shunted portion of the input signal.

5. The system of claim 4, wherein the reciprocal transfer function is applied according to the following equation in dB/ft, where f is frequency in MHz:

$$\text{reciprocal transfer function} \approx 0.003012(1.97\sqrt{f} + (0.023f) + 0.05/\sqrt{f}).$$

6. The system of claim 1, wherein the at least one equalizer further comprises a skew compensation stage between the equalization stage and the signal switch, wherein the skew compensation stage is configured to selectably apply a delay to an output signal from the at least one equalizer's output amplifier circuit.

7. The system of claim 1, further comprising a third signal transmitter coupled to the signal switch by a third balanced transmission line cable with the same first length.

8. A balanced transmission line based video signal switching system comprising:
    a video signal switch coupled to at least one balanced transmission line video receiver;
    a first signal transmitter coupled to the signal switch by a first balanced transmission line cable with a first length;
    at least one second signal transmitter coupled to the signal switch by a second balanced transmission line cable with a second length different from the first length; and
    at least one equalizer coupled between the at least one second signal transmitter and the signal switch, the at least one equalizer comprising:
        an equalization stage including an output amplifier circuit and a first variable resistor configured to select a gain of the equalization stage to selectively provide (1) positive equalization and (2) negative equalization; and
        a stabilizer stage including a second variable resistor and a control signal amplifier, the control signal amplifier configured to provide a buffered voltage to the output amplifier circuit based on a selected resistance of the second variable resistor;
    wherein the selection of the gain configures the at least one equalizer to provide substantially between −500 feet to 500 feet of equalization to a signal received from the second signal transmitter.

9. The system of claim 8, wherein the second balanced transmission line cable is a shielded twisted pair cable.

10. The system of claim 8, wherein the second balanced transmission line cable is a unshielded twisted pair cable.

11. The system of claim 8, wherein the equalization stage further includes a cable equalization filter configured to shunt a portion of the input signal, received from the first variable resistor, to an input terminal of the output amplifier, and wherein the first variable resistor is a three-terminal potentiometer.

12. The system of claim 11, wherein the equalization stage further includes a gain setting resistor arranged in parallel with a series combination of the first variable resistor and a feedback resistor, wherein the feedback resistor is arranged in a feedback path of the output amplifier circuit, and wherein the gain of the equalization stage is based on a ratio of the gain setting resistor and the feedback resistor.

13. The system of claim 11, wherein the cable equalization filter is further configured to apply a reciprocal transfer function to the shunted portion of the input signal.

14. The system of claim 13, wherein the reciprocal transfer function is applied according to the following equation in dB/ft, where f is frequency in MHz:

$$\text{reciprocal transfer function} \approx 0.003012(1.97\sqrt{f} + (0.023f) + 0.05/\sqrt{f}).$$

15. The system of claim 8, wherein the at least one equalizer further comprises a skew compensation stage between the equalization stage and the signal switch, wherein the skew compensation stage is configured to selectably apply a delay to an output signal from the at least one equalizer's output amplifier circuit.

16. The system of claim 8, further comprising a third signal transmitter coupled to the signal switch by a third balanced transmission line cable with the same first length.

17. A balanced transmission line based video signal switching system comprising:
    a video signal switch coupled to at least one balanced transmission line video receiver;
    a first signal transmitter coupled to the signal switch by a first balanced transmission line cable with a first length;
    at least one second signal transmitter coupled to the signal switch by a second balanced transmission line cable with a second length different from the first length; and
    at least one equalizer coupled between the at least one second signal transmitter and the signal switch, the at least one equalizer comprising:
        an equalization stage to selectively provide (1) positive equalization and (2) negative equalization, the equalization stage including an output amplifier circuit configured to receive a signal from one or more of a first variable resistor, a cable equalization filter, a feedback resistor, and a gain setting resistor;
        a stabilizer stage including a second variable resistor and a control signal amplifier, the control signal amplifier configured to provide a buffered voltage to the output amplifier circuit using the second variable resistor; and
        a skew compensation stage coupled between the equalization stage and the signal switch, wherein the skew compensation stage is configured to selectably apply a delay to an output signal from the at least one equalizer's output amplifier circuit;
    wherein at maximum positive equalization, the cable equalization filter is arranged in parallel with the gain setting resistor in the equalization stage; and wherein at maximum negative equalization, the cable equalization filter is arranged in parallel with the feedback resistor in the equalization stage.

* * * * *